No. 826,260. PATENTED JULY 17, 1906.
C. MARKMANN.
GAS STOVE.
APPLICATION FILED DEC. 22, 1905.

Witnesses:
Arthur Gumpe.
William Schulz.

Inventor:
Charles Markmann
by Hauff & Biesen Atty.

THE NORRIS PETERS CO., WASHINGTON, D. C.

UNITED STATES PATENT OFFICE.

CHARLES MARKMANN, OF NEW YORK, N. Y.

GAS-STOVE.

No. 826,260.     Specification of Letters Patent.     Patented July 17, 1906.

Application filed December 22, 1905. Serial No. 292,897.

*To all whom it may concern:*

Be it known that I, CHARLES MARKMANN, a citizen of the United States, residing at New York city, Manhattan, county and State of New York, have invented new and useful Improvements in Gas-Stoves, of which the following is a specification.

This invention relates to a gas-stove provided with a water-tank beneath the top plate and surrounding the burners, so that a body of water may be simultaneously heated while the stove is put to its ordinary uses.

Figure 1:
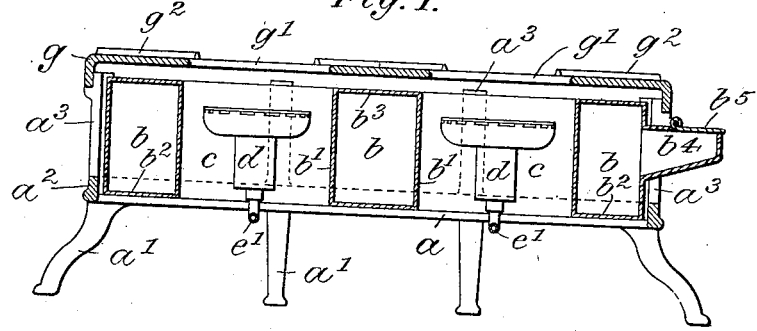
Figure 2:
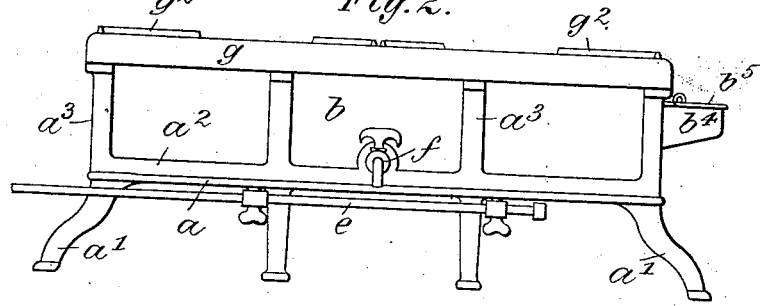
Figure 3:
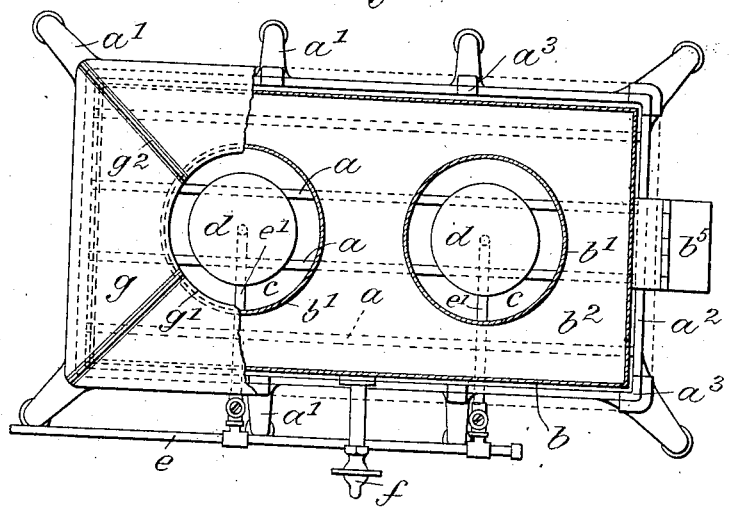

In the accompanying drawing, Figure 1 is a vertical longitudinal section of a gas-stove embodying my invention; Fig. 2, a front view thereof; and Fig. 3 a sectional plan, partly broken away.

The letter $a$ indicates an open base-plate supported upon legs $a'$ and provided with a flange $a^2$, from which project upwardly a number of arms $a^3$, the whole constituting the frame of the stove. Upon base-plate $a$ is removably supported a water tank or reservoir $b$, having bottom plate $b^2$ and top plate $b^3$. Reservoir $b$ is surrounded by the arms $a^3$, such arms projecting slightly above the tank. Through tank $b$ extend a suitable number of tubular shells $b'$, constituting the walls of heating-chambers $c$, that are thus surrounded by the tank and are open at the top and bottom.

Each chamber $c$ contains a gas-burner $d$, the head of which is arranged below the top of the tank, so that the heat given off will heat the water in the tank. The burners $d$ are mounted on the ends of branch pipes $e'$, connected to the common service-pipe $e$. Cold water is admitted to the tank by a suitable inlet $b^4$, provided with hinged lid $b^5$, that also constitutes a safety-valve. The heated water is drawn off by a cock $f$. Upon the arms $a^3$ is removably supported a top plate $g$, having annular pot-holes $g'$ above the chambers $c$ and ribs $g^2$ for sustaining the cooking vessels.

It will be seen that in use the stove while heating the cooking vessels placed on top plate $g$ will simultaneously heat a body of water contained in tank $b$ beneath such plate. Thus the heating of the water will go on without in any way interfering with the cooking operation or without diminishing the capacity of the stove.

The tank $b$ may at any time be removed for the purpose of repair or cleaning by first lifting the top plate $g$ off the arms $a^3$.

In lieu of using gas as the heating medium other equivalent means may obviously be employed.

What I claim is—

A stove provided with a base having upwardly-extending arms, a tank removably supported upon the base between the arms, and provided with a tubular shell extending through the tank to form a heating-chamber, a burner within said chamber, and a top plate supported by the arms above the tank, substantially as specified.

Signed by me at New York city, Manhattan, New York, this 21st day of December, 1905.

CHARLES MARKMANN.

Witnesses:
   WILLIAM SCHULZ,
   FRANK V. BRIESEN.